United States Patent [19]

Raspet

[11] 4,268,408
[45] May 19, 1981

[54] SOLID CYANURIC CHLORIDE HANDLING IMPROVEMENTS WITH TRICALCIUM PHOSPHATE

[75] Inventor: Thomas M. Raspet, Greensboro, N.C.

[73] Assignee: Ciba-Geigy Corporation, Ardsley, N.Y.

[21] Appl. No.: 51,554

[22] Filed: Jun. 25, 1979

[51] Int. Cl.³ .............................................. C09K 3/00
[52] U.S. Cl. .................................. 252/182; 252/383; 252/385
[58] Field of Search ............ 252/385, 383, 182, 187 C

[56] References Cited

U.S. PATENT DOCUMENTS 3,141,882  7/1964  Franz et al. ........................ 252/385

FOREIGN PATENT DOCUMENTS 1117087  11/1961  Fed. Rep. of Germany ...... 252/385

Primary Examiner—Deborah L. Kyle
Attorney, Agent, or Firm—Karl F. Jorda

[57] ABSTRACT

A non-lumping, non-dusting free-flowing cyanuric chloride is provided by adding thereto 0.1 to 5% of finely divided tribasic calcium phosphate. The composition reduces the fumes and dust associated with handling of cyanuric chloride and is compatible with the further synthesis of cyanuric chloride to herbicides and optical brighteners.

4 Claims, No Drawings

SOLID CYANURIC CHLORIDE HANDLING IMPROVEMENTS WITH TRICALCIUM PHOSPHATE

FIELD OF THE INVENTION

This invention relates to compositions of cyanuric chloride to reduce dusting and lumping and to provide flowability of solid cyanuric chloride and more particularly it relates to cyanuric chloride composition compatible for further synthesis to herbicides and optical brighteners.

BACKGROUND OF THE INVENTION

Cyanuric Chloride, symmetrical 2,4,6-trichloro-1,3,5-triazine, is a useful intermediate. However current handling methods result in significant amounts of fumes and dust which present a health hazard to plant personnel.

In addition cyanuric chloride on storage has been noted for its tendency to cake, lump and bridge in its storage containers. The latter proclivity presents serious hazards as removal of such caked cyanuric chloride from storage containers requires special handling for further processing.

It has been proposed to handle the cyanuric chloride as a melt or in solution but such expedients are expensive and often interfere with further processing.

It has also been proposed that certain oxides of titanium, silicon and aluminum as well as silicates and carbonates be added to improve the flow characteristics of cyanuric chloride.

U.S. Pat. No. 3,141,882 particularly recommends the use of gas-phase produced silicas available under such trademarks as "AER-O-SIL" and "CAB-O-SIL". Such materials are suitable for cyanuric chloride when used as a bleach or for the production of aminotriazines. However, for the synthesis of the optical brighteners generically known under the trademark TINOPAL® whose synthesis is described in U.S. Pat. No. 2,762,801, these materials either interfered with the yields and purity of the products or interfered with the optical clarity and brilliance of the brighteners made with such additives.

OBJECT OF THE INVENTION

It is an object of this invention to provide cyanuric chloride compositions substantially free from dusting and having excellent flowability even after prolonged storage.

It is another object of this invention to provide cyanuric chloride compositions which are inexpensive and which provide cyanuric chloride in a form suitable for use in the synthesis of further products without reducing the yields or qualities of such products.

It is a further object of this invention to provide cyanuric chloride in a form that is safe for handling in industrial environments.

SUMMARY OF THE INVENTION

These and other objects are attained for formulating cyanuric chloride into compositions containing finely divided tribasic calcium phosphate in amounts of from 0.1 to 5 weight % of the composition. The cyanuric chloride should preferably have a particle size of less than 30μ (microns) and the resulting composition should have a particle size range of from 25 to 300μ and a preferred range of 50 to 100μ. It is preferred that the composition have a bulk density range of 0.750 g/ml to 0.910 g/ml. When stored, it develops a packed density in the range 0.910 g/ml to 1.100 g/ml yet maintains its flowability.

DETAILED DESCRIPTION OF THE INVENTION

The cyanuric chloride of this invention has the formula:

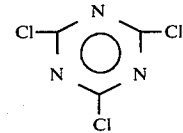

and is prepared by the trimerization of cyanogen chloride in the gas-phase.

The solid cyanuric chloride is desublimed as an amorphous powder by cooling from the vapor phase after the trimerization reaction is completed.

The tribasic calcium phosphate of this invention has the formula $Ca_3(PO_4)_2$ and is a commercially available additive for use in food and industrial processing as "tricalcium phosphate". The commercial material is available in a "reagent" grade. The industrial grade is suitable for this invention but generally the food grade material is preferred as it has a more uniform particle size within the preferred range.

The tricalcium phosphate was compared for the purposes of the present invention in a series of tests with other commonly used anti-caking agents including those flow-additives described in U.S. Pat. No. 3,141,882. Only tricalcium phosphate in the composition according to this invention was satisfactory in all the tests.

Various recognized flow-improving additives were screened for their flowability properties vis a vis cyanuric chloride by placing 100 gm of untreated cyanuric chloride into a clear wide-mouth 16 oz. glass jar and adding thereto 1.0 wt. % of the flow-additive to be tested. The cyanuric chloride and the flow-additive were then thoroughly mixed and the sample jar was inverted. The cyanuric chloride mixture either discharged or remained compacted, indicating flow or no-flow. Tests were also carried out at additive concentrations of 2.5 and 4 wt. %. Only calcium carbonate, magnesium carbonate, sodium phosphate, tricalcium phosphate, fumed silicas such as AER-O-SIL, CAB-O-SIL and TULLANOX®, stearates of calcium, magnesium and zinc, magnesium and calcium sulfates and corn starch imparted satisfactory flow properties at 1% concentration. Of these additives, when the jars containing the mixtures were stored and inverted at weekly intervals to determine the flowability, it was found that calcium sulfate, calcium carbonate, sodium phosphate, corn starch and many others could not maintain flowability of the cyanuric chloride over four week periods of such storage conditions.

It was also noted that those additives that improve the flow characteristics of cyanuric chloride had small particle sizes, all below about 50μ and that no mixtures having particle sizes of greater than 300μ provided flowability.

In addition, as cyanuric chloride is an important intermediate for the synthesis of further economically useful compounds, the cyanuric chloride compositions of this invention were also tested to ensure their compatibility in such synthesis by comparing the results achieved with the various mixtures in actual synthesis of such materials.

The cyanuric chloride/flow additive mixtures were tested in the synthesis of the herbicide Simazine (2-chloro-4,6-bis-monoethylamino-s-triazine) according to the general method described at col. 3 (A) of U.S. Pat. No. 2,891,855 substituting monoethylamine for the methylbutylamine used therein;

and in the synthesis of the optical brighteners of the TINOPAL class, e.g., 4,4'-bis[4-phenylamino-6-($\beta$-hydroxyethylmethylamino)-1,3,5-triazinyl-(2)-amino]-stilbene-2,2'-disulfonic acid, as set forth in Example 1 of U.S. Pat. No. 2,762,801 and, with appropriate substitution of intermediates but using the same synthesis scheme, 4,4'[4-di-$\beta$-hydroxyethylamino-6-p-sulfanilamido-1,3,5-triazinyl-2-amino] stilbene-2,2'-disulfonic acid.

Only the tricalcium phosphate-containing composition provided extended storage capabilities and long-acting flowability and, with respect to the optical brighteners, did not hinder these synthesis or detract from the yields or quality of the final products.

In general, the tricalcium phosphate may be added to the cyanuric chloride at any time to provide a free-flowing composition but to facilitate handling of the cyanuric chloride it is useful to directly add the tricalcium phosphate to the cyanuric chloride as it is desublimed from the trimerization stage. The tricalcium phosphate is blown into the desublimer by an inert gas, preferably nitrogen, and is supplied in an average particle size range of 2–50$\mu$, preferable in the range 5–30$\mu$.

It is noted that cyanuric chloride desublimed in the absence of the tricalcium phosphate develops particle size range up to about 300$\mu$, however, when desublimed in the presence of the very finely divided tricalcium phosphate the resultant composition has a particle size range of 50 to 150$\mu$ with an aggregate size of less than 100$\mu$, i.e., a distribution range of 50 to 100$\mu$.

It has also been observed that the composition of this invention has a bulk density of 0.750 g/ml to 0.910 g/ml and a packed density of 0.910 g/ml to 1.100 g/ml.

Tricalcium phosphate for use as the flow additive in the composition of this invention is commercially available in the preferred range 5 to 30$\mu$ as food grade tricalcium phosphate. However, industrial grade material meeting this preferred range can be obtained.

Thus, the invention supplies compositions containing 95.0 to 99.9% cyanuric chloride and having 0.1 to 5.0% of tricalcium phosphate distributed therethrough. The composition is a free-flowing form, capable of prolonged storage and compatible with the use of cyanuric chloride in further synthesis to other economically useful materials.

The mode and time of addition of the tricalcium phosphate to the cyanuric chloride have little to no effect on the flowability or compatibility of the compositions of this invention provided that the resulting cyanuric chloride mixture has a particle size of less than 300$\mu$. The amorphous material of up to this larger particle size, when admixed with the tricalcium phosphate still provides a flowable mass.

EXAMPLE 1

Cyanuric chloride stored at ambient conditions for 14 days, having an aggregate particle size of about 100$\mu$, was well mixed with 1.0 weight % of food grade tricalcium phosphate (aggregate particle size about 7$\mu$). One hundred gm of the mixture was placed into a 16 oz wide mouth sample jar. The jar was then inverted and the mixture therein was found to be free flowing. This contrasted with a control sample of 100 gm of the cyanuric chloride without the additive, similarly packed into the jar, which upon inversion did not flow but bridged and remained in place with the bottom of the jar.

The mixture in the jar with 1% of tricalcium phosphate was stored for one week and then inverted. It still flowed freely within the jar. The procedure of one week storage followed by inversion was repeated for four weeks. The composition remained flowable.

EXAMPLE 2

Industrial grade tricalcium phosphate (aggregate size 10$\mu$) was injected via a nitrogen stream into the desublimer portion of a cyanuric chloride trimerizer. The nitrogen flow was adjusted to add the tricalcium phosphate at a rate to provide 1% by wt. of tricalcium phosphate to cyanuric chloride. The mixture had an aggregate particle size of about 75$\mu$ but reduced dusting was noted in the bulk handling of the product as compared with untreated cyanuric chloride.

The resultant composition was tested for flowability by the procedure described in Example 1. The mixture maintained its flowability even after four weeks. The cyanuric chloride directly obtained from the desublimer section of the trimerizer (without tricalcium phosphate) did not even pass the initial flowability test.

EXAMPLE 3

The portions of the mixture prepared as described in Example 2 were used for the synthesis of the herbicide and the optical brighteners discussed above. The resulting products were obtained in good yields and of satisfactory quality, meeting the standards set for synthesis with cyanuric chloride without tricalcium phosphate.

I claim:

1. A non-lumping, free-flowing cyanuric chloride composition comprising cyanuric chloride having admixed therewith and distributed therethrough 0.1 to 5% of finely divided tricalcium phosphate of the formula $Ca_3(PO_4)_2$.

2. The cyanuric chloride composition according to claim 1 wherein said tricalcium phosphate has a particle size of less than about 30 microns.

3. The cyanuric chloride composition according to claim 1 wherein said composition has an aggregate particle size in the range 50 to 100 microns.

4. The cyanuric chloride composition according to claim 1 wherein said composition has bulk density of 0.750 g/ml to 0.910 g/ml and a packed density of 0.910 g/ml to 1.100 g/ml.

* * * * *